US012628071B2

(12) United States Patent
Wu et al.

(10) Patent No.:  US 12,628,071 B2
(45) Date of Patent:    May 12, 2026

(54) IDENTIFYING RELAY USER EQUIPMENT FOR SIDELINK RELAY

(71) Applicant: Apple Inc., Cupertino, CA (US)

(72) Inventors: Zhibin Wu, Los Altos, CA (US); Shu Guo, Beijing (CN); Chunxuan Ye, San Diego, CA (US); Haijing Hu, Los Gatos, CA (US); Haitong Sun, Cupertino, CA (US); Seyed Ali Akbar Fakoorian, San Diego, CA (US); Sudeep Manithara Vamanan, Nuremberg (DE); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 451 days.

(21) Appl. No.: 17/919,998

(22) PCT Filed: Oct. 21, 2021

(86) PCT No.: PCT/CN2021/125350

§ 371 (c)(1),
(2) Date: Oct. 19, 2022

(87) PCT Pub. No.: WO2023/065226

PCT Pub. Date: Apr. 27, 2023

(65) Prior Publication Data

US 2024/0214910 A1     Jun. 27, 2024

(51) Int. Cl.
H04W 48/14       (2009.01)
H04W 76/14       (2018.01)
H04W 88/04       (2009.01)
H04W 92/18       (2009.01)

(52) U.S. Cl.
CPC ........... H04W 48/14 (2013.01); H04W 76/14 (2018.02); H04W 88/04 (2013.01); H04W 92/18 (2013.01)

(58) Field of Classification Search
CPC ..... H04W 48/14; H04W 76/18; H04W 88/04; H04W 92/18
See application file for complete search history.

(56) References Cited

U.S. PATENT DOCUMENTS

2018/0070400 A1     3/2018  Wu et al.
2023/0180313 A1*    6/2023  Freda ................... H04W 76/14
                                                            370/310

FOREIGN PATENT DOCUMENTS

| CN | 107637162 A | 1/2018 |
|---|---|---|
| CN | 113423101 A | 9/2021 |
| JP | 2018524883 A | 8/2018 |
| WO | 2016160278 A1 | 10/2016 |
| WO | 2017187713 A1 | 11/2017 |

(Continued)

OTHER PUBLICATIONS

Futurewei, "Open Issues in Switching between Direct and Indirect Paths," 3GPP TSG RAN WG2 Meeting #115-e, R2-2107540, E-Conference, Aug. 9-27, 2021 (Year: 2021).*

(Continued)

*Primary Examiner* — Brian P Cox
(74) *Attorney, Agent, or Firm* — Kilpatrick Townsend & Stockton LLP

(57) ABSTRACT

The present application relates to devices and components including apparatus, systems, and methods for managing relay identifiers for sidelink relays in wireless networks.

15 Claims, 15 Drawing Sheets

(56)                References Cited

FOREIGN PATENT DOCUMENTS

WO          2021138166 A1      7/2021

OTHER PUBLICATIONS

International Patent Application No. PCT/CN2021/125350, International Search Report and Written Opinion, Mailed on Jul. 18, 2022, 10 pages.
3rd Generation Partnership Project; Technical Specification Group Services and System Aspects; Proximity based Services (ProSe) in the 5G System (5GS) (Release 17), 3GPP TS 23.304 V17.0.0, Sep. 2021, 99 pages.
3rd Generation Partnership Project; Technical Specification Group Radio Access Network; NR; Radio Resource Control (RRC) protocol specification (Release 16), 3GPP TS 38.331 V16.6.0, Sep. 2021, 961 pages.
Further discussion on Service continuity of L2 U2N relay, Qualcomm Incorporated, 3GPP TSG RAN WG2 Meeting #115-e, R2-2107106, Aug. 9-27, 2021, 8 pages.

Encoding of N3iwf Selection Information for 5g Prose Layer-3 Remote UE, 3rd Generation Partnership Project Technical Specification Group CT Working Group1 #132e C1-216108, Oct. 11-15, 2021, 13 pages.
ProSe ID Collision, 3rd Generation Partnership Project Technical Specification Group-Radio Access Network Working Group2 #91bis, R2-154319, Oct. 5-Oct. 9, 2015, 5 pages.
Japan Patent Application No. 2024-523719, Office Action, Jan. 30, 2025, 5 pages.
3rd Generation Partnership Project; Technical Specification Services and System Aspects; Architecture enhancements for 5G System (5GS) to support Vehicle-to-Everything (V2X) services (Release 17), 3GPP TS 23.287 V17.1.0, Sep. 2021, 59 pages.
Clarifications on Layer-2 ID for UE-to-Network Relay discovery, 3 Generation Partnership Project Technical Specification Group-Working Group SA2 Meeting #145E e-meeting S2-2104270, Elbonia, May 17-28, 2021, pp. 1-5.
European Patent Application No. 21960976.5, Extended European Search Report, May 7, 2025, 11 pages.

* cited by examiner

800

Base station
108

Relay UE
104

Configuration message (relay-ID-historykeep-interval)
804

Maintain list of relay UE IDs used for
relay discovery within time interval
808

RRC connection establishment
812

Sidelink UE information NR (list of relay UE IDs)
816

1100

1200

Receiving, from an AMF, a message to authorize a first UE for ProSe relay
1204

Receiving a measurement report from a second UE
1208

Transmitting configuration information to the first UE to configure the first UE as a relay for the second UE
1212

1300

IDENTIFYING RELAY USER EQUIPMENT FOR SIDELINK RELAY

CROSS-REFERENCE TO RELATED APPLICATION

This application is a 371 U.S. National Phase of PCT International Patent Application No. PCT/CN2021/125350, filed Oct. 21, 2021, which is herein incorporated by reference in its entirety for all purposes.

BACKGROUND

Third Generation Partnership Project (3GPP) Technical Specifications (TSs) define standards for New Radio (NR) wireless networks. These TSs describe aspects related to relay services that may be provided by a relay user equipment (UE) for the benefit of a remote UE.

DETAILED DESCRIPTION

Figure 1:
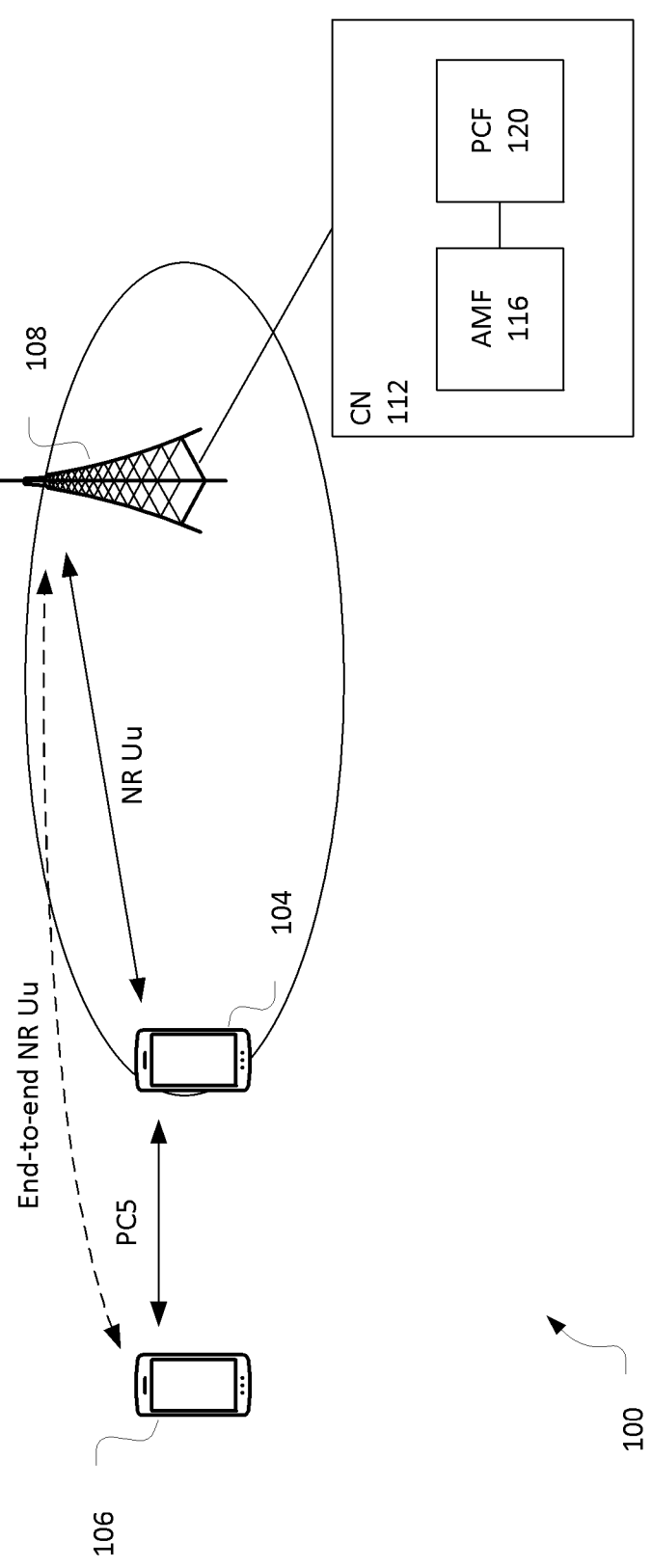
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel." "transmission channel," "data transmission channel," "access channel," "data access channel," "link." "data link," "carrier." "radio-frequency carrier," or any other like term denoting a pathway or medium through which data is communicated. Additionally, the term "link" as used herein refers to a connection between two devices for the purpose of transmitting and receiving information.

The terms "instantiate." "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include UE 104, UE 106, and base station 108 of a radio access network (RAN). The base station (BS) 108 may be a next generation node B (gNB) of a next generation (NG)-RAN that provides one or more 5G New Radio (NR)

cells. The NR cells may present NR user plane and control plane protocol terminations toward the UEs 104/106.

The network environment 100 may further include a core network (CN) 112. For example, the CN 112 may comprise a 5th Generation Core network (5GC). The CN 112 may be coupled to the base station 108 via a fiber optic or wireless backhaul. The CN 112 may provide functions for the UE 104 via the base station 108. These functions may include managing subscriber profile information, subscriber location, authentication of services, or switching functions for voice and data sessions. The CN 112 may include an access and mobility function (AMF) 120 that is responsible for registration management (e.g., for registering UE 104, etc.), connection management, reachability management, mobility management, lawful interception of AMF-related events, and access authentication and authorization. The CN 112 may also include a policy control function (PCF) that provides policies associated with mobility and session management. The functions provided by the CN 112 may be implemented in one or more servers or other devices in a centralized location or in distributed locations.

The UE 104 may be disposed within an NR cell provided by the base station 108 and may be coupled with the base station 108 via an NR Uu interface. The UE 104 may also have a sidelink connection over a sidelink physical interface, which may also be referred to as a PC5 interface, with the UE 106, which may also be referred to as the remote UE 106. The UE 104 may act as a UE-to-network (U2N) relay to extend network coverage to the remote UE 106. The UE 104 may also be referred to as relay UE 104. The remote UE 106 may be outside of the network coverage due to a location of the remote UE 106 being outside of the NR cell or because the remote UE 106 has turned off its Uu modem to save power, for example, and is only operating its sidelink modem. By providing a layer 2 UE-to-NW relay, the remote UE 106 may be accessible and controllable by the base station 108 via an end-to-end NR Uu interface that includes the PC5 and the NR Uu interfaces.

Except as otherwise discussed herein, the devices of the network environment 100 may provide proximity services (ProSe) direct discovery, direct communications, and UE-to-network relay consistent with descriptions provided in 3GPP TS 24.555 v0.4.0 (2021-08).

Figure 2:
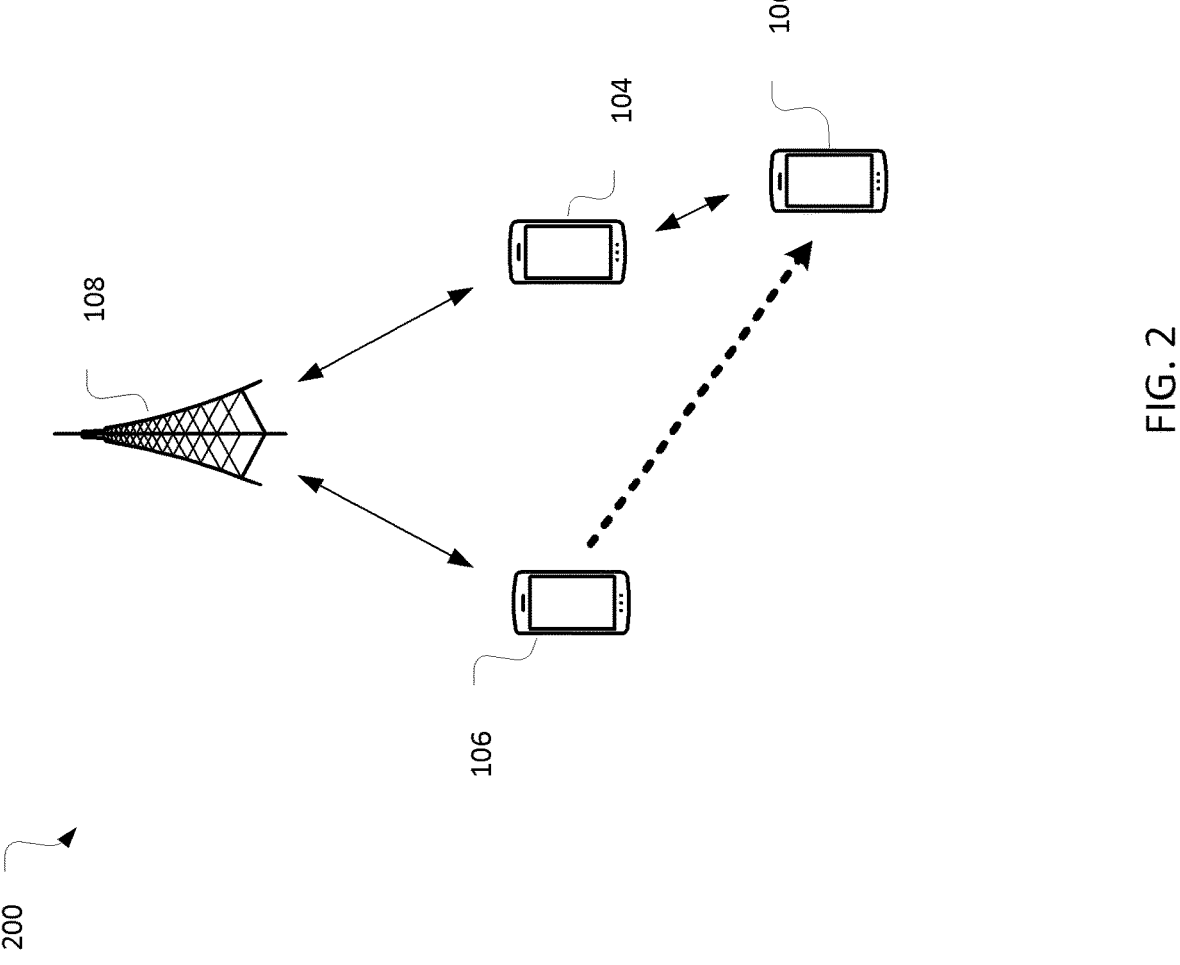
FIG. 2 illustrates a mobility scenario in the network in accordance with some embodiments.

FIG. 2 illustrates devices of the network environment 100 with respect to a mobility scenario in accordance with some embodiments. In particular, the mobility scenario may correspond to an intra-BS direct-to-indirect handover. This type of handover may occur when the remote UE 106 selects a relay (for example, the relay UE 104) that is camped on the same base station (for example, base station 108) with which the remote UE 106 is initially connected as a target for the handover. Thus, the remote UE 106 may be under the control of the same base station before and after the handover. These types of handovers may occur for a number of reasons including, for example, the remote UE 106 moving out of coverage of the base station 108; the remote UE 106 powering down its NR Uu modem; or based on a determination that the remote UE 106 may be better served by the relay UE 104 in terms of uplink throughput or reliability.

Figure 3:
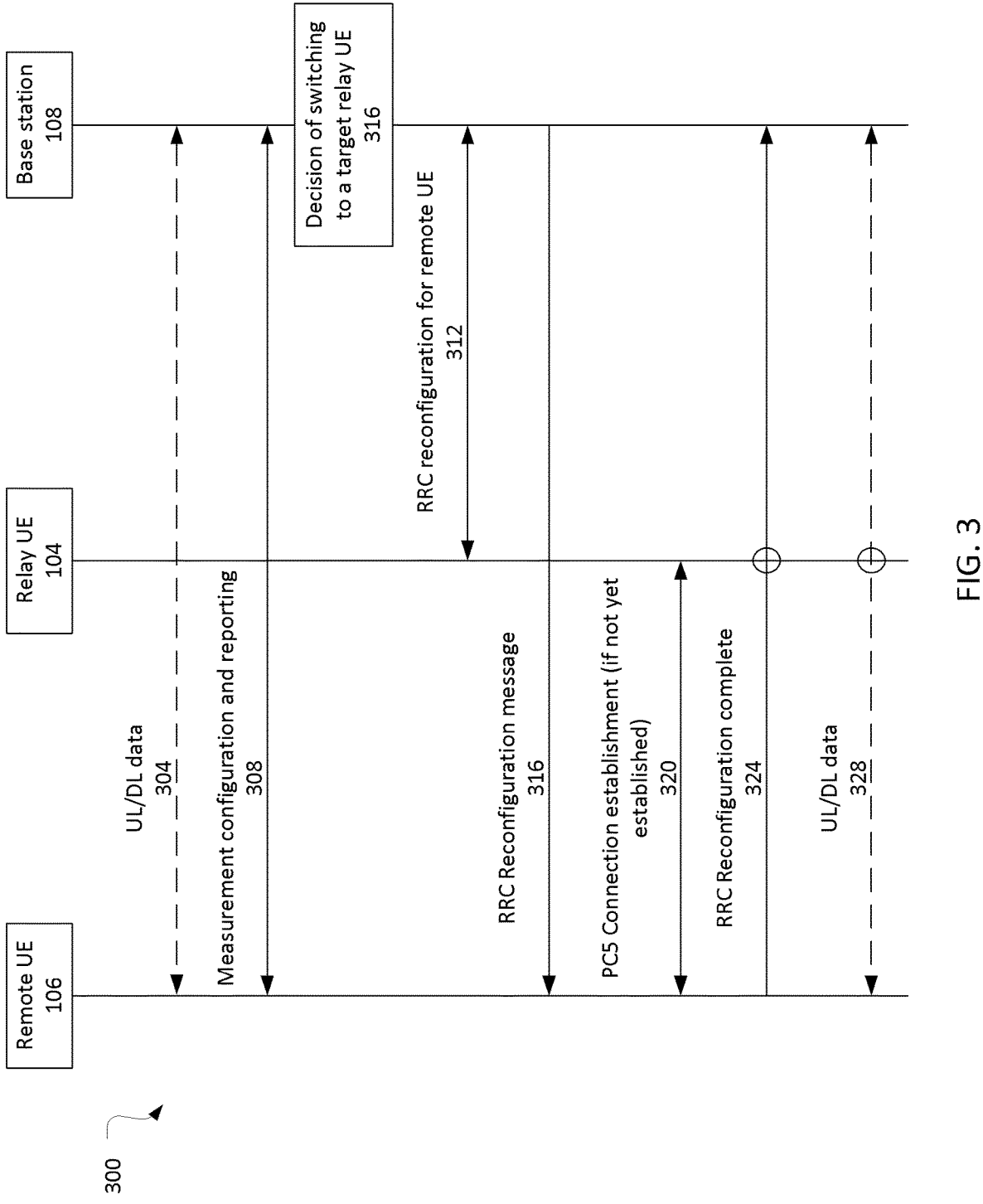
FIG. 3 illustrates a signaling flow in accordance with some embodiments.

FIG. 3 illustrates a signaling flow 300 that describes an intra-BS direct-to-indirect handover in accordance with some embodiments.

The signaling flow 300 may include, at 304, the remote UE 106 and the base station 108 exchanging uplink/downlink data directly over an NR Uu interface.

The signaling flow 300 may further include, at 308, measurement configuration and reporting. The remote UE 106 may measure/discover a number of candidate U2N relay UEs and send resulting reports to the network. The reports may correspond to one or more candidate U2N relay UEs and legacy Uu measurements. The remote UE 106 may filter the appropriate U2N relay UEs based on relay selection criteria before reporting. The remote UE 106 may report only the U2N relay UE candidates that fulfill higher-layer criteria, which may configured to the remote UE 106 by the network. The reporting may include a U2N relay UE identifier (ID), an NR serving cell ID (NCI) of the U2N relay UE, and sidelink discovery—reference signal received power (SD-RSRP) information.

At 316, the base station 108 may decide to switch the remote UE 106 to a target U2N relay UE, for example, relay UE 104. The base station 108 may then, at 312, send a radio resource control (RRC) reconfiguration message to the relay UE 104 to configure the relay UE 104 to provide a relay service for the remote UE 106. The base station 108 may also send an RRC reconfiguration message to the remote UE 106 at 316. The RRC reconfiguration message transmitted to the remote UE 106 may include the relay UE ID and a PC5 radio link control (RLC) configuration for relay traffic and the associated end-to-end radio bearer(s). The remote UE 106 may stop user plane and control plane transmission over the Uu interface after reception of the RRC reconfiguration message from the base station 108.

The signaling flow 300 may further include, at 320, the remote UE 106 establishing a PC5 connection with the relay UE 104. In some instances, a PC5 connection may have previously been established, negating the need to establish the connection at this time.

At 324, the signaling flow 300 may include the remote UE 106 sending an RRC reconfiguration complete message to the base station 108 to complete the path switch procedure. The RRC reconfiguration complete message may be transmitted to the base station 108 via the relay UE 104. Thereafter, the data path may be switched from direct path to indirect path. At 328, the uplink and downlink data may be exchanged between the remote UE 104 and the base station 108 via the end-to-end NR Uu connection. As shown in FIG. 1, the end-to-end NR Uu connection includes a PC5 connection between the remote UE 106 and the relay UE 104 and an NR Uu connection between the relay UE 104 and the base station 108.

The U2N relay UE ID (or simply, "relay UE ID") used in the mobility scenario described in FIG. 3 is an identifier commonly shared among the remote UE 106, the relay UE 104, and the base station 108. While this sharing may be desired in an L2 relay, it may not be needed in an L3 relay. In contrast to an L2 relay UE, an L3 relay UE may not need to be synced with the base station as the relay service may be transparent to the NG-RAN.

Figure 4:
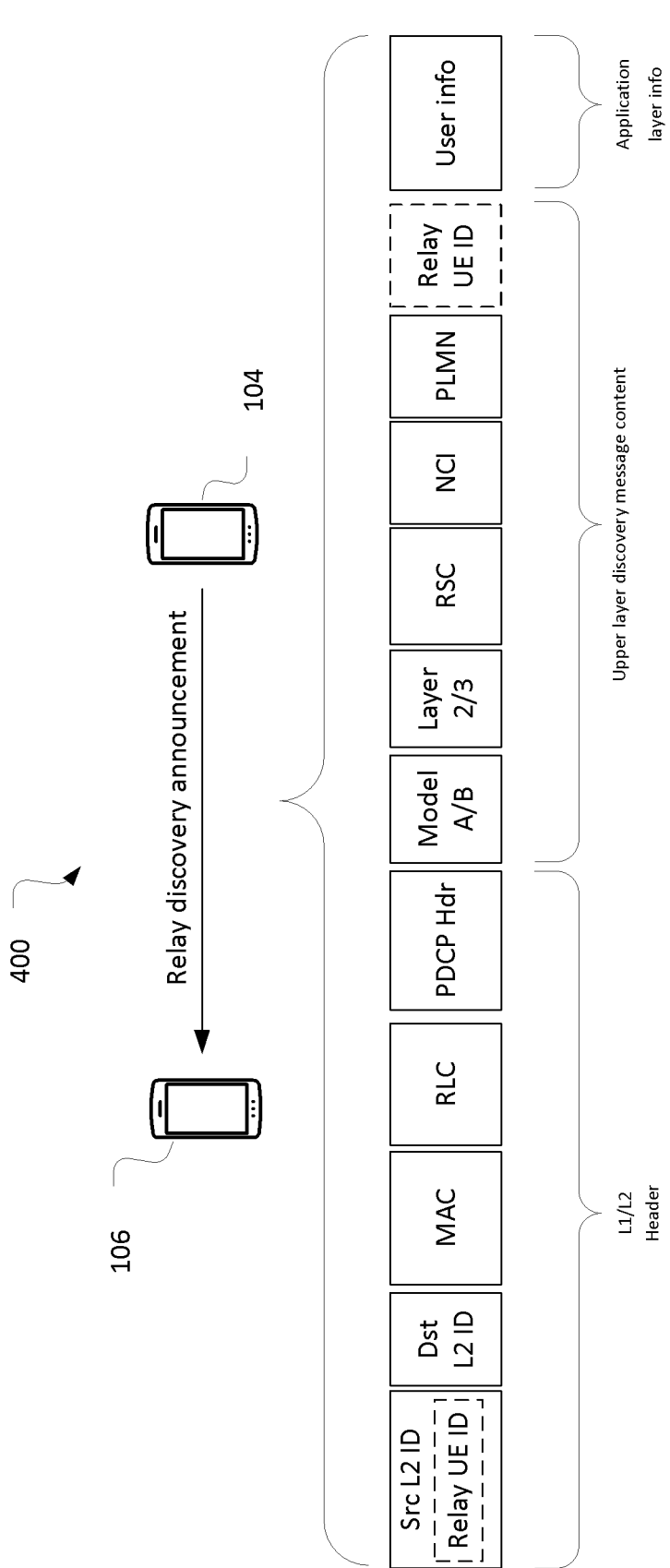
FIG. 4 illustrates signaling of a relay discovery announcement in accordance with some embodiments.

FIG. 4 illustrates signaling of a relay discovery announcement 400 in accordance with some embodiments. The relay UE 104 may transmit the relay discovery announcement 400 to the remote UE 106 as part of a discovery procedure. The discovery procedure may be a model A or B procedure similar to that described in section 5.3.1.2 of Technical Specification (TS) 23.303 v 16.0.0 (2020-07-09).

The model A procedure, which may be referred to collo- quially as the "I am here" procedure, may define two roles for UEs that are participating in ProSe direct discovery. A first role may be that of an announcing UE that announces certain information that could be used by UEs in proximity that have permission to discover. The relay UE 104 may serve the first role and act as the announcing UE. A second role may be that of a monitoring UE that monitors for certain information of interest in proximity of announcing UEs. The remote UE 104 may serve the second role and act as the monitoring UE. In this model, the announcing UE may broadcast the relay discovery announcement 400 at pre- defined discovery intervals. The monitoring UEs that are interested in these announcements may read and process them.

The model B procedure, which may be referred to collo- quially as the "Who is there?/Are you there?" procedure, may also define two roles for the ProSe-enabled UEs that are participating in ProSe direct discovery. A first role may be that of a discoverer UE that transmits a request containing certain information about what is interested to discover. The remote UE 106 may serve the first role and act as the discoverer UE. A second role may be that of a discoveree UE that receives the request message and can respond with some information related to the discoverer's request. The relay UE 104 may serve the second role and act as the discoveree UE. Thus, the discoverer UE may send information about other UEs from which it would like to receive responses. For example, the information can be about a ProSe application identity corresponding to a group and the members of the group can respond. In response, the relay UE 104 may transmit the relay discovery announcement 400.

The relay discovery announcement 400 may include a variety of fields organized in a layer one (L1)/L2 header, upper layer discovery message content, and an application layer information.

The L1/L2 header may include fields to carry a source (src) L2 ID, a destination (dst) L2 ID, media access control (MAC) content, radio link control (RLC) content, and a packet data convergence protocol (PDCP) header.

The upper layer discovery message content may include a model A/B field to carry an indication of whether model A or model B discovery type is supported. The upper layer discovery message content may further include a layer ⅔ field to carry an indication of whether the relay UE 104 may operate as an L2 or an L3 relay. The upper layer discovery message content may further include a relay service code (RSC) field to carry an RSC that provides an indication of the types of relay services provided by the relay UE 104. The upper layer discovery message content may further include a NCI field to include an ID of the NR cell upon which the relay UE 104 is camped. The upper layer discovery message content may further include a public land mobile network (PLMN) field to provide an indication of a PLMN with which the relay UE 104 is connected.

The application layer information may include user infor- mation that may be provided to an application layer of the remote UE 106.

The relay discovery messages may be used by relay UEs to advertise an access service on behalf of the network. However, the network may not be able to track which advertisements are announced by which relay UEs when using relay discovery messages in legacy discovery proce- dures. This may be based on the legacy messages lacking the relay UE ID and the existing fields being inadequate to uniquely identify a relay UE. For example, the relay service code, which may be assigned by upper layers, is not a unique identifier and may be shared by a group of relay UEs; the source L2 ID is self-chosen by the relay UE 104; and the destination L2 ID is a common broadcast address. This may cause various disambiguation and reachability issues. For example, a base station may have difficulty in reaching a relay UE for handover.

Thus, embodiments describe how a relay UE ID is to be defined: the temporal nature of the relay UE ID (for example, whether it is permanent, semi-permanent, or dynamically changed); and how to change the relay UE ID in a manner such that all parties are in sync with the change.

Various embodiments also describe how the relay UE 104 is to signal the relay UE ID in the relay discovery announcement. As will be described in further detail below, the relay UE ID may be provided within the source L2 ID field or in a new field in the upper layer discovery message content. In some instances, the new field may be in a ProSe layer. If the relay UE ID is provided within the source L2 ID field, it may be part or all of the 24-bit source L2 ID. If the relay UE ID is provided within a new field in the upper layer discovery message content, it may or may not be 24-bits.

Figure 5:
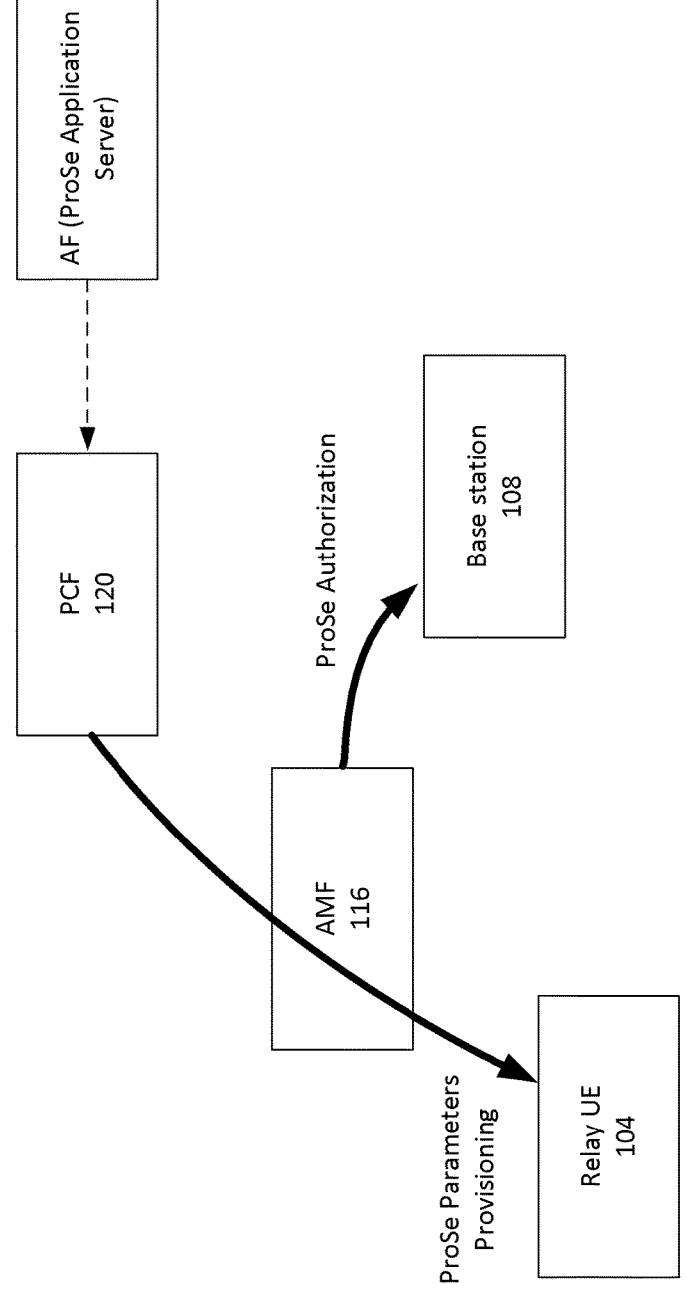
FIG. 5 illustrates a procedure of a first aspect in accordance with some embodiments.

FIG. 5 illustrates a procedure 500 of first aspect of the disclosure in which an upper layer approach is used to create and assign the relay UE ID in accordance with some embodiments. In the first aspect, the network functions of the CN 112 may provide an upper layer relay UE ID to the relay UE 104. The relay UE ID may also be given to the base station 108 via next-generation application protocol (NGAP) signaling along with a ProSe relay authorization. Changing the relay UE ID may be controlled by the CN 112.

The PCF 120 may provision the relay UE 104 (and other relay UEs) with ProSe parameters. The ProSe parameters may include a relay UE ID along with a relay service code. The ProSe parameters may be provisioned to the relay UE as part of UE policies that are encoded within a ProSe policy (ProSeP) data structure. In particular, the relay UE ID(s) may be provided along with the RSC list. The ProSeP may be provided to the relay UE 104 using the UE policy delivery service such as that described in 3GPP TS 24.501 v17.4.1 (2021-09-27).

The AMF 116 may transmit an NGAP message to the NG-RAN (for example, base station 108) based on the ProSe parameters. The NGAP message may include the relay UE ID along with a ProSe authorization of whether the relay UE 104 is authorized to act as a 5G ProSe L2 U2N relay. In some embodiments, the NGAP message may be part of a UE context modification request or an initial context set up request message.

The relay UE ID may be an N-bit identifier that is associated with the relay UE 104 for provision of relay services. In some embodiments, if the relay UE 104 supports a plurality of relay services, it may be associated with a respective plurality of relay UE identifiers. Each relay UE identifier may correspond to one or more relay UE services. The relay UE 104 may then identify the offered relay services by including the corresponding relay UE ID in a relay discovery message (for example, the relay discovery announcement).

When the base station 108 receives the relay UE ID from a report of the remote UE 106 (or from another base station via inter-base station signaling), it can locate the UE context associated with the relay UE 104 (assuming the relay UE 104 is currently connected to the base station 108). The base station 108 may then reconfigure the relay UE 104 and remote UE 106 for relay services as discussed above with respect to FIG. 3.

Second and third aspects of the disclosure provide lower layer approaches in which relay UE IDs are generated and managed by the relay UE 104 or the base station 108 without involvement from the core network 112. The base station 108 may discard the relay UE IDs whenever a UE context is deleted. This may occur when the relay UE 104 enters an RRC idle state. The base station 108 may maintain an ID space so that the relays within its cell(s) are not using the same ID. This may ensure uniqueness among the relay UEs that are in the RRC connected state. The relay UE ID may be determined or confirmed whenever the relay UE enters the RRC connected state in a cell.

Figure 6:
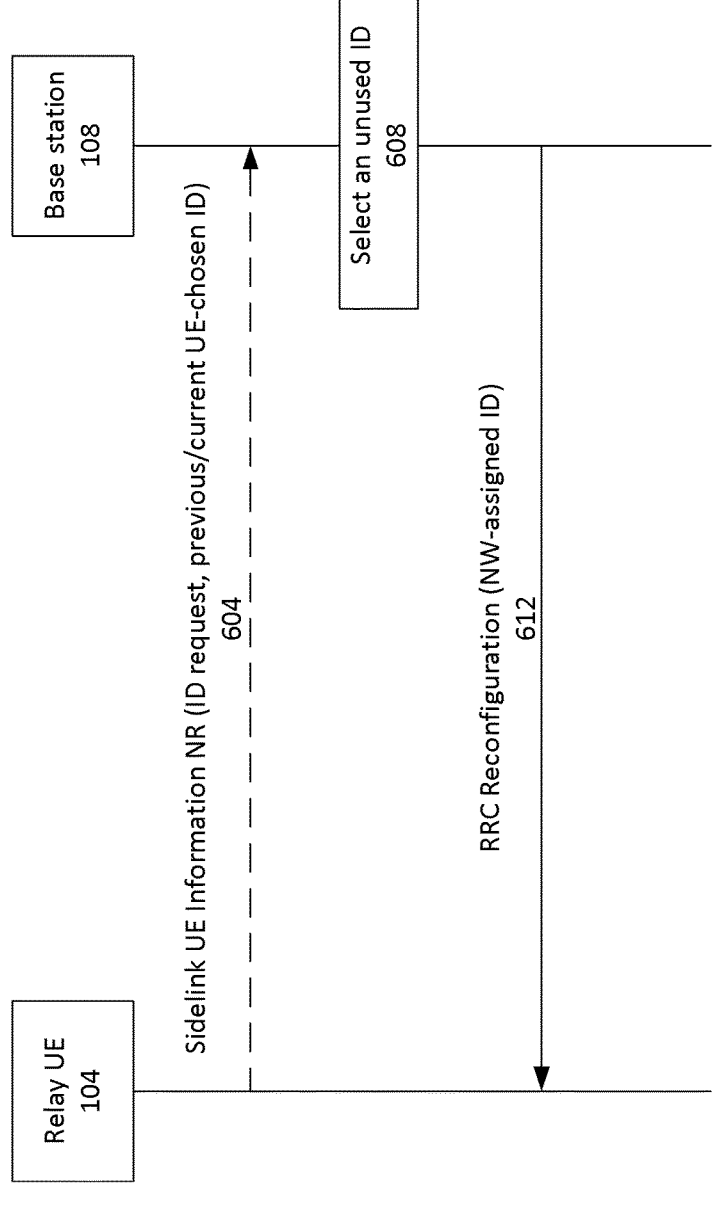
FIG. 6 illustrates a procedure of a second aspect in accordance with some embodiments.

FIG. 6 illustrates a procedure 600 of the second aspect of the disclosure in which a lower layer approach is used to create and assign the relay UE ID in accordance with some embodiments. In the second aspect, the base station 108 may choose a unique identifier for the relay UE 104 to use as its relay UE ID. The base station 108 may then provide an indication of the ID in an RRC message transmitted to the relay UE 104. In some embodiments, the relay UE ID may be the same as, or at least based on, a cell-RNTI (C-RNTI).

The procedure 600 may include the relay UE 104 transmitting sidelink UE information to the base station 108 at 604. The sidelink UE information may include an ID request. In some embodiments, the sidelink UE information may also include UE-chosen IDs currently or previously used by the relay UE 104 for relay services.

At 608, the base station may select an unused ID. This may be based on the ID request in the sidelink UE information received at 604. However, in other embodiments, the base station 108 may initiate the procedure 600 on its own initiative without relying on a request from the relay UE 104.

The unused ID may be selected based on an ID space that includes a list of currently associated or unassociated IDs. In this manner, the base station may identify a unique identifier that may be assigned to the relay UE as a relay UE ID.

In some embodiments, the relay UE ID may be the same as, or at least based on, the 16-bit C-RNTI. This may avoid the burden of having another cell-managed ID. Further, given that the C-RNTI is already exposed in the access stratum (AS) layer, there is less privacy concern with using this identifier in an announcement message.

At 612, the base station may transmit the NW-assigned ID to the relay UE for use as the relay UE ID. The identifier may be transmitted to the relay UE 104 in an RRC reconfiguration message.

Figure 7:
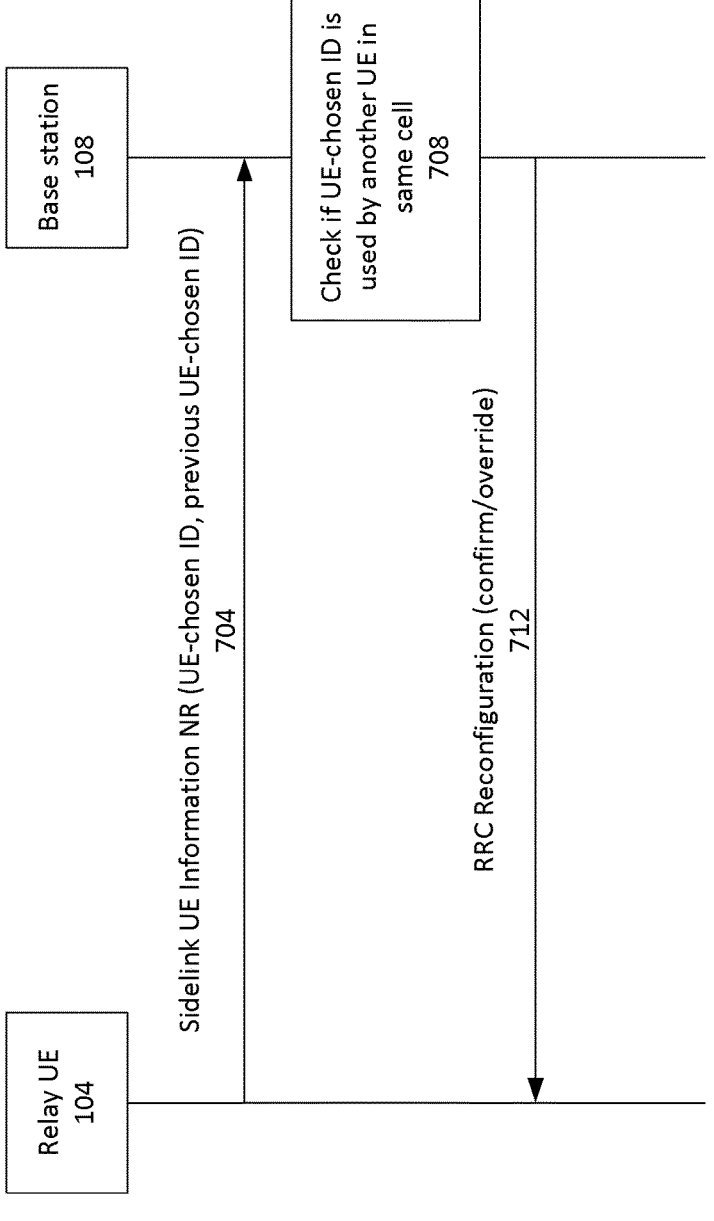
FIG. 7 illustrates a procedure of a third aspect in accordance with some embodiments.

FIG. 7 illustrates a procedure 700 of the third aspect of the disclosure in which a lower layer approach is used to create and assign the relay UE ID in accordance with some embodiments. In the third aspect of the disclosure, another lower layer approach may be used to create and assign the relay UE ID. In this aspect, the relay UE 104 may select an identifier and convey it to the base station 108. The base station 108 may confirm the selection or override it with a different ID (if, for example, the selected identifier is already associated with another relay UE and would result in a collision). The base station 108 may then send the confirmation or new identifier back to the relay UE 104.

The procedure 700 may include, at 704, the relay UE 104 transmitting sidelink UE information to the base station 108. The sidelink UE information may include the UE-chosen ID. In some embodiments, the sidelink UE information may additionally include one or more UE-chosen IDs previously used as relay UE IDs.

At 708, the base station 108 may check to determine whether the UE-chosen ID is used by another UE in the same cell. The results of this determination may influence whether the base station 108 transmits a confirm or override indication in the RRC reconfiguration message at 712. If the UE-chosen ID is used by another in the same cell, the base station 108 may select an unused ID that the relay UE 104 may use as a relay UE ID. The NW-chosen ID may then be transmitted with the override indication in the RRC reconfiguration message at 712. This may be similar to that described above with respect to FIG. 6. If the UE-chosen ID is not used by another in the same cell, the base station 108 may transmit a confirm indication in the RRC reconfiguration message at 712.

There may be various reasons in which it may be desired to change a relay UE ID. For example, the relay UE 104 may want to change the ID periodically to protect its own privacy. For another example, the network may want to assign a new relay UE ID to the relay UE 104 to facilitate management at a cell-level. In various embodiments, the relay UE ID may change based on a UE-trigger or a base station-trigger. The assignment of the updated relay UE ID may be based according to the procedures described elsewhere, for example, procedures 600 or 700.

In some embodiments, the relay UE 104 may receive an RRC release and transition to an idle or inactive state from a connected state. After the relay UE 104 transitions to the idle or inactive state, it may continue to use the relay UE ID previously assigned. This may be the case even though the relay UE 104 is not reachable after leaving the current cell and transitioning out of the connected state.

In AS layer solutions, the relay UE ID is presumed to identify a relay UE in an RRC connected state. However, before the relay UE 104 enters the connected state, it may use an identifier (perhaps a self-chosen ID) in a discovery message. Thus, some embodiments may include the relay UE 104 providing UE-chosen IDs, which may be have been used during RRC idle or inactive states, to the base station. See, for example, messages 604 or 704. Providing the UE-chosen IDs to the network in this manner may help the network track relay UE ID usage history.

The network may benefit from understanding the change history of the relay UE ID in order to associate remote UEs' measurement reports of various IDs with the appropriate relay UE. For example, with respect to the second aspect of the disclosure, if the relay UE 104 does not provide an indication of previous/current UE chosen ID, the base station 108 will not be able to link earlier measurement reports (by remote UEs) that include those IDs with the relay UE 104 after it newly (re)connects with the base station 108. And, with respect to the third aspect of the disclosure, it may be insufficient for the relay UE to only report its current UE-chosen ID. For example, the base station may not have information about UE-chosen IDs that the relay UE 104 used before the current UE-chosen ID, which may have been indicated in a measurement report from remote UEs. In either case, if the network fails to associate the measurement reports with the relay UE 106 due to an unknown association between the relay UE 106 and UE-chosen IDs, the network may misjudge the feasibility of the relay UE 106 to operate as a handover candidate.

In some embodiments, the relay UE may report all UE-chosen Udos used over a time interval prior to (re) connection with the network. The time interval that defines the length of the ID history may be configured by the network or may be predefined as a fixed value in a TS such as, for example, 10 seconds.

Figure 8:
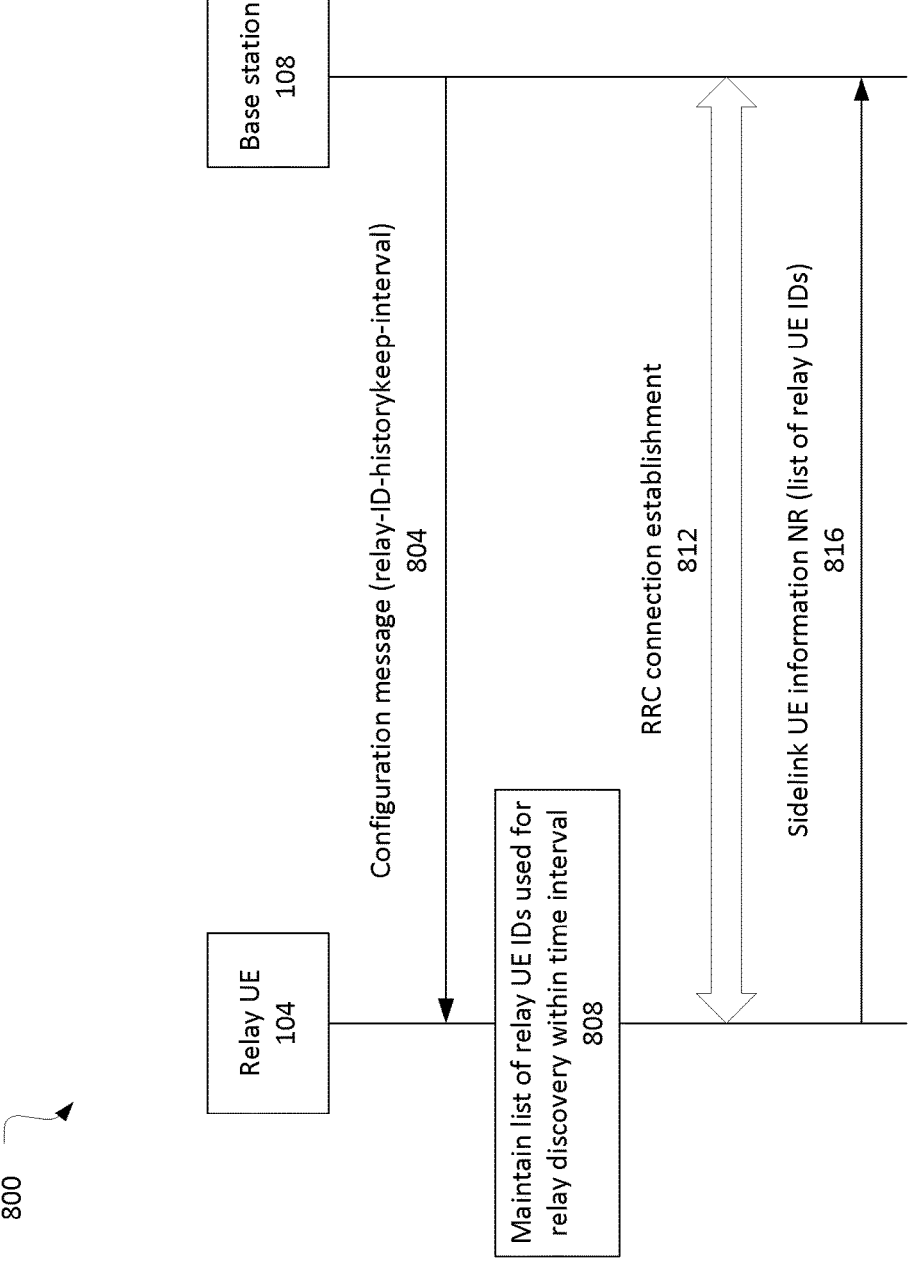
FIG. 8 illustrates a procedure for configuring and reporting identity history in accordance with some embodiments.

FIG. 8 illustrates a procedure 800 for configuring and reporting relay UE ID history in accordance with some embodiments. In the procedure 800, the relay UE 104 may report a sequence of previously and currently used relay UE IDs to the base station 108 via RRC signaling. This may happen when the relay UE 104 transfers from an idle/inactive state to a connected state. Reporting the relay UE ID history may take place at additional times in some instances.

At 804, the procedure 800 may include the base station 108 transmitting a configuration message with an indication that the UE is to report UE-chosen IDs used for relay services. In some embodiments, the message may include a relay ID history keep interval (hereinafter "keep interval") value. The configuration information may be a system information block (SIB) as part of a common U2N relay configuration or may be dedicated RRC signaling (for example, an RRC reconfiguration message). Alternatively, the keep interval value may be defined as a fixed value (for example, 10 seconds).

At 808, the relay UE 104 may maintain a list of relay UE IDs used for relay discovery in a time interval defined by the keep interval value. For example, if the keep interval value is N seconds, the relay UE may maintain a list of all relay UE IDs used for relay discovery in the previous N seconds.

At 812, the relay UE 104 may perform an RRC connection establishment with the base station 108.

At 816, the relay UE 104 may send sidelink UE information NR to the base station 108. Sidelink UE information NR may include a current version of the list of the relay UE IDs maintained by the relay UE 104. For example, if/is the time of reporting the sidelink UE information NR, and N is the keep interval value, the relay UE 104 may report a list of all the IDs used in the window [t-N, f].

In some embodiments, the reported list of relay UE IDs may always begin with the current relay UE ID. Alternatively, the current relay UE ID may be transmitted in a separate, stand-alone information element. If the report sent at 816 includes a plurality of UE-chosen IDs, it may also include an indication of the most recently used ID.

In the event the keep interval value is not provided in the configuration message or otherwise defined, the relay UE 104 may just report the UE-chosen ID that was most recently used.

Figure 9:
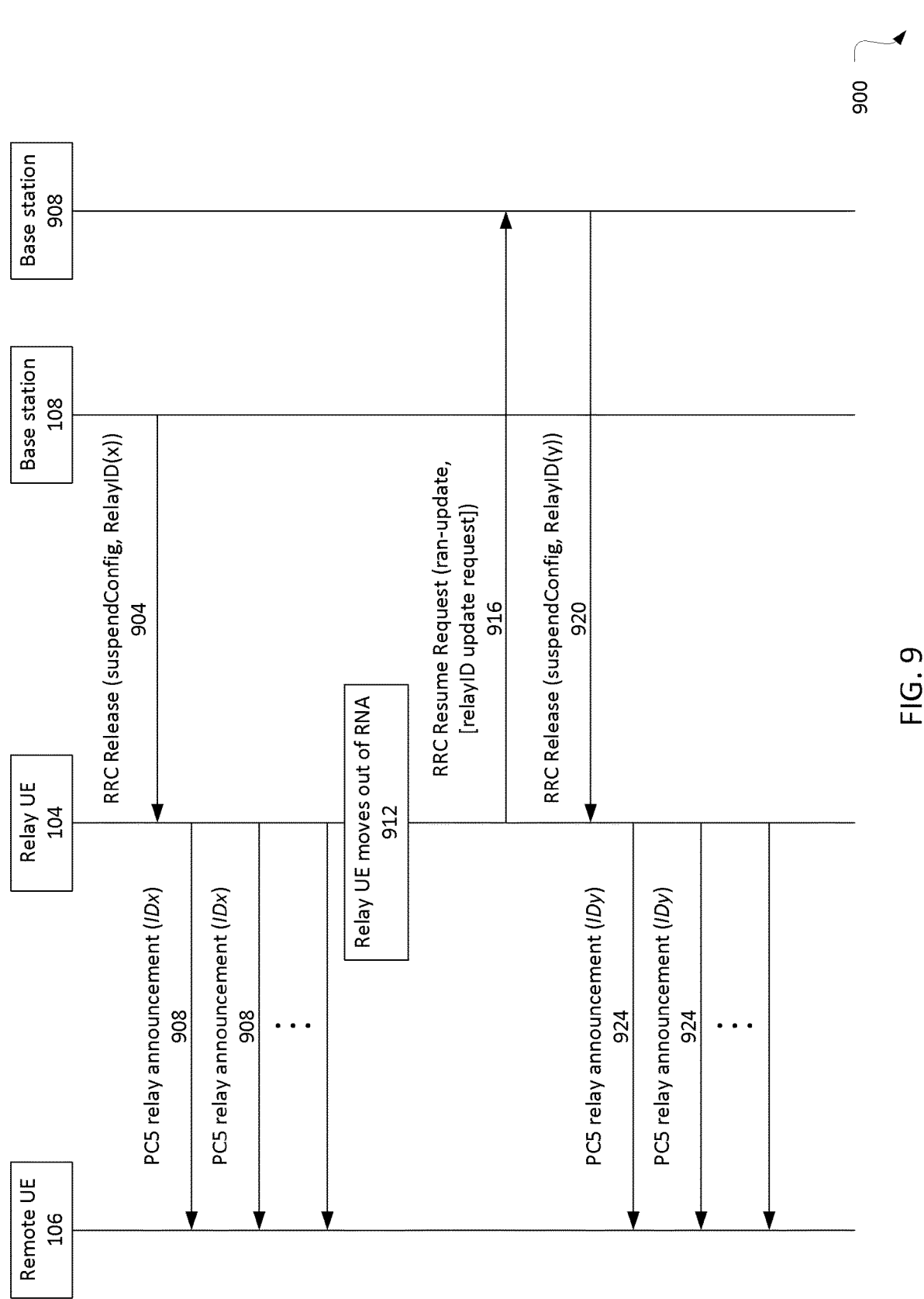
FIG. 9 illustrates a procedure of a fourth aspect in accordance with some embodiments.

FIG. 9 illustrates a procedure 900 of a fourth aspect of the disclosure in which a lower layer approach is used to create and assign the relay UE ID in accordance with some embodiments. In the fourth aspect of the disclosure, a relay UE ID may be assigned by the NG-RAN for a group of cells. The relay UE ID may be unique among a large area that includes more than one cell. In some embodiments, the relay UE ID may be assigned/managed by a centralized unit in the NG-RAN, for example, a gNB-centralized unit (CU).

The procedure 900 may include the base station 108 transmitting an RRC release to the relay UE 104 at 904. The RRC release may include a suspend configuration (suspend-Config) that includes an inactive-RNTI (I-RNTI) that may be used to identify the suspended UE context of the relay UE 104 while it is in the inactive state. The RRC release may further include a relay ID (IDx) assigned to the relay UE 104 to be used while the relay UE 104 is in the inactive state. In this manner, the relay UE ID is associated with the I-RNTI when the relay UE 104 enters RRC_INACTIVE.

The relay UE 104 may use the assigned relay UE IE (IDx) in PC5 relay announcements 908 transmitted while in a RAN-based notification area (RNA) of the base station 108. Any base station within the RNA receiving a measurement report with IDx may be able to determine that IDx is associated with the relay UE 104 based on RAN paging. For example, a base station may receive a measurement report with IDx, and use the I-RNTI associated with IDx to retrieve the suspended UE context of the relay UE 104. It may use the suspended UE context to page the relay UE 104 to bring the relay UE 104 to the connected state so that it may conduct a handover preparation.

If the base station 108 receives a measurement report with a relay UE ID and an indication of a serving cell that is provided by the base station 108, the base station 108 may have the suspended UE context stored locally. Thus, it may page the relay UE 104 based on the I-RNTI. However, in some instances, the base station 108 may receive a measurement report with a relay UE ID and an indication of a serving cell that is provided by another base station within the same RNA. In this instance, the base station 108 may transmit a request to the other base station for the suspended UE context associated with the relay UE ID. Upon receipt of the suspended UE context, the base station 108 may proceed to page the relay UE ID and prepare for handover.

At 912, the relay UE 104 may move out of the RNA and may need to change its relay UE ID to ensure RAN paging reachability. To do this, the relay UE 104 may transmit an RRC resume request to a base station 908 of the new RNA at 916. The RRC resume request may include a RNA update element and a relay ID update request.

At 920, the base station 908 may transmit an RRC release message with a suspend configuration and an updated relay UE ID (relay ID(y)) to be used while the relay UE 104 is in the inactive state. The relay UE 104 may use the newly-assigned relay UE IE (IDy) in PC5 relay announcements 924 transmitted while in an RNA of the base station 908.

Figure 10:
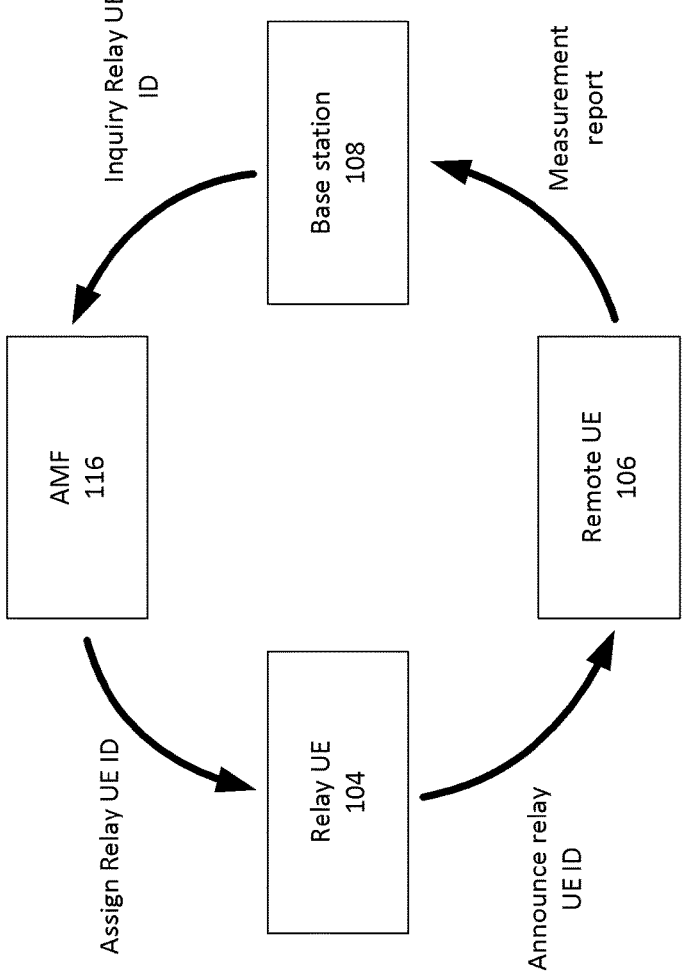
FIG. 10 illustrates a procedure of a fifth aspect in accordance with some embodiments.

FIG. 10 illustrates a signaling flow 1000 of a fifth aspect of the disclosure in which an upper layer approach is used to create and assign the relay UE ID in accordance with some embodiments. In the fifth aspect of the disclosure, a relay UE ID may be managed/assigned by the AMF 116 based on, for example, a 5G S-Temporary Mobile Subcriber Identity (TMSI).

The signaling flow 1000 may include the AMF 116 assigning a relay UE ID to the relay UE 104. In some embodiments, the AMF 116 may provide a 48-bit 5G S-TMSI to the relay UE 104 to use in deriving the relay UE ID. The S-TMSI is a shortened version of the 5G global unique temporary identifier (GUTI) designed to facilitate efficient radio signaling procedures during paging and service requests. The S-TMSI may be constructed from a mobility management entity code (MMEC) and a mobile TMSI (M-TMSI). To derive the relay UE ID based on the S-TMSI, the relay UE 104 may determine a hash output of the S-TMSI and its serving cell ID (NR cell identifier (NCI)). For example, the relay UE 104 may determine the Relay UE ID based on the following equation:

$$\text{Relay } UE\ ID = \text{hash}(S - TMSI + NCI). \qquad \text{Equation 1}$$

Providing the relay UE ID as the hash output of the S-TMSI and the serving cell ID may alleviate any privacy concerns given that the 48 bit S-TMSI may resist brute-force attacks. Further, the relay UE ID may automatically change when the relay UE 104 moves from one serving cell to another. Notifying the network of this change of relay UE ID may not be necessary.

The signaling flow 1000 may further include the relay UE 104 broadcasting the relay UE ID (and NCI as shown in FIG. 4) in relay discovery messages transmitted in accordance with model A or B discovery procedures.

The remote UE 106 may transmit a measurement report with the relay UE ID to the base station 108.

Upon receiving the measurement report from the remote UE 106, the base station 108 may send an inquiry with the relay UE ID to the AMF 116. The AMF 116 may resolve the relay UE ID to the 5G-S-TMSI value and use this value to locate the UE context and state of the relay UE 104. The AMF 116 may then transmit the UE context/state to the base station 108. If the context is stored in the base station 108, the base station 108 may update the context with the new identifier to maintain the association in the future.

Various features of the aspects of the disclosure are described below.

In the first aspect, the same network assigned ID may be created/used as the relay UE ID for a relay UE that is in an RRC idle state, an RRC connected state, or an RRC inactive/idle state after RRC release. The network reachability of the relay UE (for example, during handover) may be possible in the idle state, inactive state, and connected state.

In the second aspect, a UE-chosen ID may be created/used as the relay UE ID for a relay UE in the RRC idle state: a base station assigned ID may be created/used as the relay UE ID for a relay UE in the RRC connected state; and the relay UE may continue to use a previous ID as the relay UE ID in an inactive/idle state after an RRC release. The network reachability of the relay UE (for example, during handover) may be possible in the connected state.

In the third aspect, a UE-chosen ID may be created/used as the relay UE ID for a relay UE in the RRC idle state: an ID chosen by the UE and confirmed by the base station or an ID set by the base station after overriding the UE-chosen ID may be created/used as the relay UE ID for a relay UE in the RRC connected state: and the relay UE may continue to use a previous ID as the relay UE ID in an inactive/idle state after an RRC release. The network reachability of the relay UE (for example, during handover) may be possible in the connected state.

In the fourth aspect, a UE-chosen ID may be created/used as the relay UE ID for a relay UE in the RRC idle state: an NG-RAN-assigned ID may be created/used as the relay UE ID for a relay UE in the RRC connected state: and the relay UE may continue to use a previous ID or use a new network assigned ID as the relay UE ID in an inactive/idle state after an RRC release. The network reachability of the relay UE (for example, during handover) may be possible in the inactive state and the connected state.

The second, third, and fourth aspects describe using the UE-chosen ID in the RRC idle state. This may be avoided by requiring the relay UE to at least enter the connected state once before starting the relay discovery procedure. In some instances, this may alleviate the need to update a network with a history of UE-chosen IDs in order to ensure that all entities are properly synchronized.

In the fifth aspect, the same AMF-assigned ID, which may vary cell by cell if hashed with NCI, may be created/used as the relay UE ID for a relay UE in an RRC idle state, an RRC connected state, or an RRC inactive/idle state after RRC release. The network reachability of the relay UE (for example, during handover) may be possible in the idle state, inactive state, and connected state.

Figure 11:
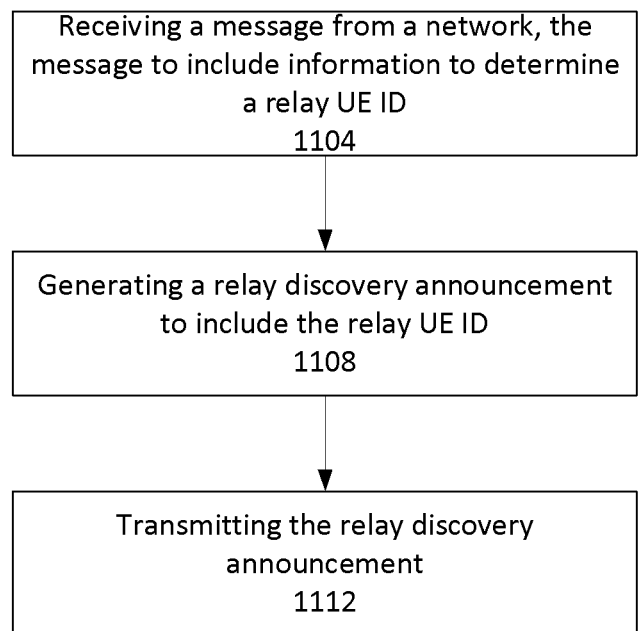
FIG. 11 illustrates an operation flow/algorithmic structure in accordance with some embodiments.

FIG. 11 provides an operation flow/algorithmic structure 1100 in accordance with some embodiments. The operation flow/algorithmic structure 1100 may be performed/implemented by a UE such as, for example, relay UE 104, UE 1400 or by components thereof, for example, processors 1404.

The operation flow/algorithmic structure 1100 may include, at 1104, receiving a message from the network. The message received from the network may include information to determine a relay UE ID. In some embodiments, the information may be the relay UE ID itself. In other embodiments, the information may provide a basis for deriving the relay UE ID. For example, the information may be an S-TMSI that the UE may use along with an NCI to determine the relay UE ID.

In some embodiments, the message may be an AS message received from a base station or a NAS message received from a PCF (via the base station) or an AMF (via the base station).

In some embodiments, the message may include the relay UE ID within a source layer 2 ID field or within a separate relay UE ID field in, for example, a ProSe layer.

The operation flow/algorithmic structure 1100 may further include, at 1108, generating a relay discovery announcement to include the relay UE ID. The relay discovery announcement may be as part of a model A or B discovery process.

The operation flow/algorithmic structure 1100 may further include, at 1112, transmitting the relay discovery announcement. The relay discovery announcement may be transmitted while the UE is in an RRC connected state or in an RRC inactive state.

Figure 12:
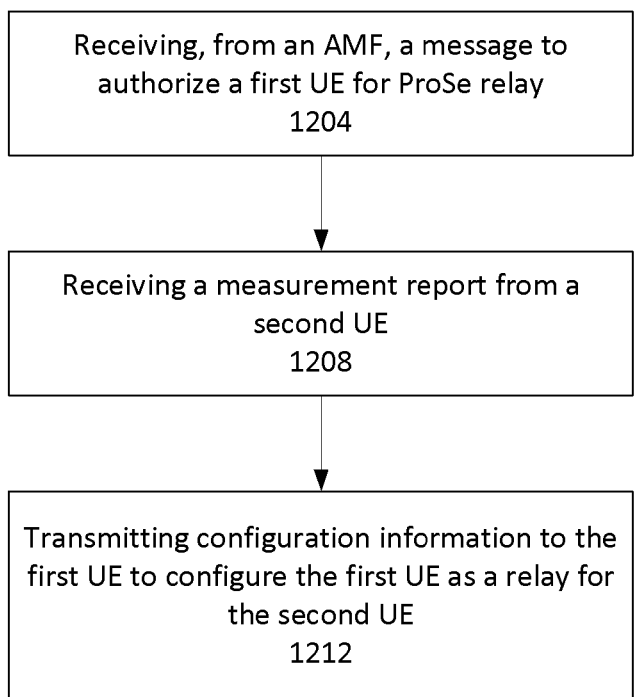
FIG. 12 illustrates another operation flow/algorithmic structure in accordance with some embodiments.

FIG. 12 provides an operation flow/algorithmic structure 1200 in accordance with some embodiments. The operation flow/algorithmic structure 1200 may be performed/implemented by a base station such as, for example, base station 108, device 1500 or by components thereof, for example, processors 1504.

The operation flow/algorithmic structure 1200 may include, at 1204, receiving a message to authorize a first UE for ProSe relay. The message may be received from an AMF and may include a relay UE ID for the first UE. In some embodiments, the message may be an NGAP message that comprises a UE context modification request or an initial context set up request.

The operation flow/algorithmic structure 1200 may further include, at 1208, receiving a measurement report from a second UE. The measurement report may include the relay UE ID, an NCI, and SD-RSRP information. Based on the measurement report, the base station may identify the first UE as a target relay for the second UE.

The operation flow/algorithmic structure 1200 may further include, at 1212, transmitting configuration information to the first UE to configure the first UE as a relay for the second UE.

Figure 13:
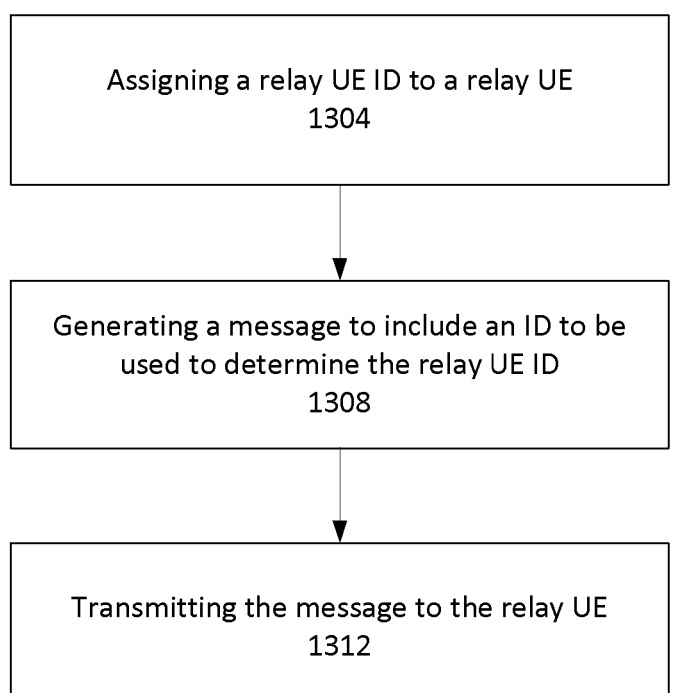
FIG. 13 illustrates another operation flow/algorithmic structure in accordance with some embodiments.

FIG. 13 provides an operation flow/algorithmic structure 1300 in accordance with some embodiments. The operation flow/algorithmic structure 1300 may be performed/implemented by a function of a core network such as, for example, AMF 116, PCF 120, or device 1500 or by components thereof, for example, processors 1504.

The operation flow/algorithmic structure 1300 may include, at 1304, assigning a relay UE ID to a relay UE. The CN function may assigned the relay UE ID with a desired uniqueness. For example, the CN function may determine that no other UE is associated with the relay UE ID within a particular granularity such as, for example, a cell, an RNA, etc. The association between the relay UE ID and the relay may be stored in memory of a device that implements the CN function.

The operation flow/algorithmic structure 1100 may further include, at 1108, generating a message to include an ID to be used to determine the relay UE ID. In some embodiments, the message may include the relay UE ID itself, or may include information (for example, an S-TMSI) that the UE may use to derive the relay UE ID.

The operation flow/algorithmic structure 1100 may further include, at 1112, transmitting the message to the relay UE. The message may include a ProSe policy structure with other ProSe parameters.

Figure 14:
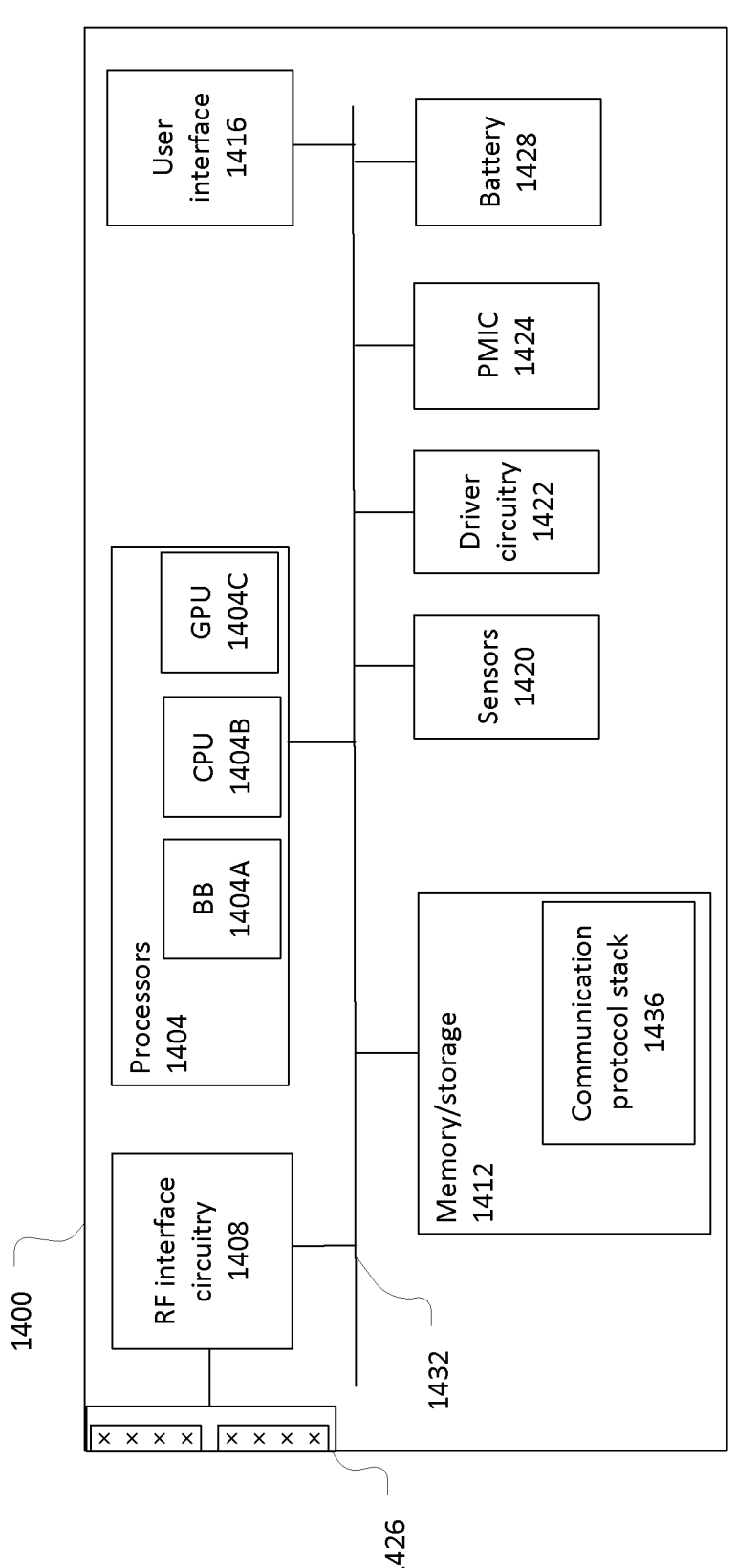
FIG. 14 illustrates a user equipment in accordance with some embodiments.

FIG. 14 illustrates a UE 1400 in accordance with some embodiments. The UE 1400 may be similar to and substantially interchangeable with relay UE 104 or remote UE 106.

The UE 1400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1400 may include processors 1404, RF interface circuitry 1408, memory/storage 1412, user interface 1416, sensors 1420, driver circuitry 1422, power management integrated circuit (PMIC) 1424, antenna structure 1426, and battery 1428. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangement of the components shown may occur in other implementations.

The components of the UE 1400 may be coupled with various other components over one or more interconnects 1432, which may represent any type of interface, input/output, bus (local, system, or expansion), transmission line, trace, or optical connection that allows various circuit components (on common or different chips or chipsets) to interact with one another.

The processors 1404 may include processor circuitry such as, for example, baseband processor circuitry (BB) 1404A, central processor unit circuitry (CPU) 1404B, and graphics processor unit circuitry (GPU) 1404C. The processors 1404 may include any type of circuitry or processor circuitry that executes or otherwise operates computer-executable instructions, such as program code, software modules, or functional processes from memory/storage 1412 to cause the UE 1400 to perform operations as described herein.

In some embodiments, the baseband processor circuitry 1404A may access a communication protocol stack 1436 in the memory/storage 1412 to communicate over a 3GPP compatible network. In general, the baseband processor circuitry 1404A may access the communication protocol stack 1436 to: perform user plane functions at a PHY layer. MAC layer, RLC layer, PDCP layer, and SDAP layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 1408.

The baseband processor circuitry 1404A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1412 may include one or more non-transitory, computer-readable media that includes instructions (for example, communication protocol stack 1436) that may be executed by one or more of the processors 1404 to cause the UE 1400 to perform various operations described herein. The memory/storage 1412 include any type of volatile or non-volatile memory that may be distributed throughout the UE 1400. In some embodiments, some of the memory/storage 1412 may be located on the processors 1404 themselves (for example, L1 and L2 cache), while other memory/storage 1412 is extremal to the processors 1404 but accessible thereto via a memory interface. The memory/storage 1412 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1408 may include transceiver circuitry and radio frequency front module (RFEM) that allows the UE 1400 to communicate with other devices over a radio access network. The RF interface circuitry 1408 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1426 and proceed to filter and amplify (with a low-noise amplifier) the signal. The signal may be provided to a receiver of the transceiver that down-converts the RF signal into a baseband signal that is provided to the baseband processor of the processors 1404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1426.

In various embodiments, the RF interface circuitry 1408 may be configured to transmit/receive signals in a manner compatible with NR and sidelink access technologies.

The antenna 1426 may include antenna elements to convert electrical signals into radio waves to travel through the air and to convert received radio waves into electrical signals. The antenna elements may be arranged into one or more antenna panels. The antenna 1426 may have antenna panels that are omnidirectional, directional, or a combination thereof to enable beamforming and multiple input, multiple output communications. The antenna 1426 may include microstrip antennas, printed antennas fabricated on the surface of one or more printed circuit boards, patch antennas, or phased array antennas. The antenna 1426 may have one or more panels designed for specific frequency bands including bands in FR1 or FR2.

The user interface circuitry 1416 includes various input/output (I/O)) devices designed to enable user interaction with the UE 1400. The user interface 1416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1400.

The sensors 1420 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers: microelectromechanical systems or nanoelectromechanical systems comprising 3-axis accelerometers, 3-axis gyroscopes, or magnetometers: level sensors, flow sensors: temperature sensors (for example, thermistors): pressure sensors; barometric pressure sensors; gravimeters: altimeters; image capture devices (for example, cameras or lensless apertures): light detection and ranging sensors: proximity sensors (for example, infrared radiation detector and the like), depth sensors, ambient light sensors: ultrasonic transceivers; and microphones or other like audio capture devices.

The driver circuitry 1422 may include software and hardware elements that operate to control particular devices that are embedded in the UE 1400, attached to the UE 1400, or otherwise communicatively coupled with the UE 1400. The driver circuitry 1422 may include individual drivers allowing other components to interact with or control various input/output (I/O) devices that may be present within, or connected to, the UE 1400. For example, driver circuitry 1422 may include a display driver to control and allow access to a display device, a touchscreen driver to control and allow access to a touchscreen interface, sensor drivers to obtain sensor readings of sensor circuitry 1420 and control and allow access to sensor circuitry 1420, drivers to obtain actuator positions of electro-mechanic components or control and allow access to the electro-mechanic components, a camera driver to control and allow access to an embedded image capture device, audio drivers to control and allow access to one or more audio devices.

The PMIC 1424 may manage power provided to various components of the UE 1400. In particular, with respect to the processors 1404, the PMIC 1424 may control power-source selection, voltage scaling, battery charging, or DC-to-DC conversion.

A battery 1428 may power the UE 1400, although in some examples the UE 1400 may be mounted deployed in a fixed location, and may have a power supply coupled to an electrical grid. The battery 1428 may be a lithium ion battery, a metal-air battery, such as a zinc-air battery, an aluminum-air battery, a lithium-air battery, and the like. In some implementations, such as in vehicle-based applications, the battery 1428 may be a typical lead-acid automotive battery.

Figure 15:
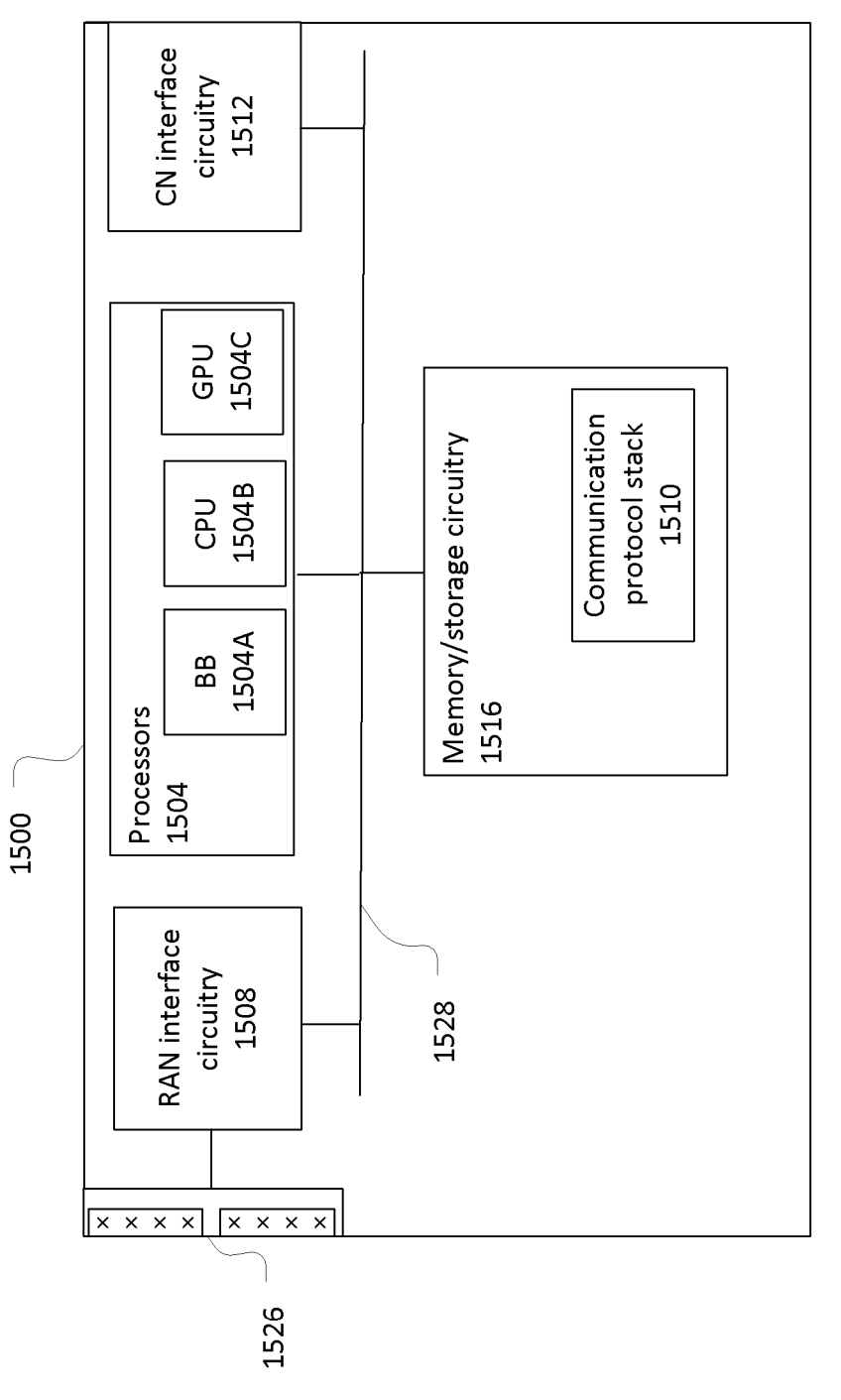
FIG. 15 illustrates a network device in accordance with some embodiments.

FIG. 15 illustrates a network device 1500 in accordance with some embodiments. The network device 1500 may be similar to and substantially interchangeable with base station 108, AMF 116, or PCF 120 of FIG. 1.

The network device 1500 may include processors 1504, RF interface circuitry 1508 (if implemented as a base station), core network (CN) interface circuitry 1512, memory/storage circuitry 1516, and antenna structure 1526 (if implemented as a base station).

The components of the network device 1500 may be coupled with various other components over one or more interconnects 1528.

The processors 1504, RF interface circuitry 1508, memory/storage circuitry 1516 (including communication protocol stack 1510), antenna structure 1526, and interconnects 1528 may be similar to like-named elements shown and described with respect to FIG. 15. If the device 1500 is implemented as a base station, the communication protocol stack 1510 may include access stratum layers. If the network device 1500 is implemented as an AMF 116 or PCF 120, the communication protocol stack 1510 may include a NAS layer.

The CN interface circuitry 1512 may provide connectivity to a core network, for example, a 5th Generation Core network (5GC) using a 5GC-compatible network interface protocol such as carrier Ethernet protocols, or some other suitable protocol. Network connectivity may be provided to/from the network device 1500 via a fiber optic or wireless backhaul. The CN interface circuitry 1512 may include one or more dedicated processors or FPGAs to communicate using one or more of the aforementioned protocols. In some implementations, the CN interface circuitry 1512 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving a message from a network, the message to include a relay UE identifier (ID); generating a relay discovery announcement to include the relay UE ID; and transmitting the relay discovery announcement.

Example 2 includes the method of example 1 or some other example herein, further comprising: receiving the message from a policy control function (PCF).

Example 3 includes method of example 2 or some other example herein, wherein the message further includes a relay service code to identify a relay service to be provided by the UE.

Example 4 includes the method of example 2 or some other example herein, wherein the message is a proximity services policy message.

Example 5 includes the method of example 1 or some other example herein, wherein the relay discovery announcement comprises: a source layer 2 ID field with a value that is based on the relay UE ID; or a relay UE ID field that has the relay UE ID.

Example 6 includes a method of example 1 or some other example herein, wherein the message includes a plurality of relay UE IDs for the UE and a plurality of relay service codes that respectively correspond to the plurality of relay UE IDs.

Example 7 includes the method of example 1 or some other example herein, wherein the message is an access stratum message.

Example 8 includes the method of example 1 or some other example herein, wherein the message is a radio resource control (RRC) release message.

Example 9 includes the method of example 8 or some other example herein, further comprising: transitioning to an RRC inactive state based on the RRC release message; and transmitting, based on a determination that the UE has moved out of a radio access network notification area (RNA), an RRC resume request with a relay ID update request.

Example 10 includes the method of example 8 or some other example herein, further comprising: transmitting the relay discovery announcement in the RRC inactive state.

Example 11 includes a method of operating a user equipment (UE), the method comprising: receiving, from a base station, a message with an indication to report UE-chosen identifiers (IDs) used for relay services; identifying one or more UE-chosen IDs used for relay services; and transmitting a report to the base station with an indication of the one or more UE-chosen IDs.

Example 12 includes the method of example 11 or some other example herein, wherein the message includes a keep interval value and the one or more UE-chosen IDs are identified as being within a time period based on the keep interval value.

Example 13 includes the method of example 11 or some other example herein, further comprising: determining a keep interval value is provided as zero, is not provided, or is not defined: and identifying a most recently used UE-chosen ID as the one or more UE-chosen IDs based on said determining.

Example 14 includes the method of example 11 or some other example herein, wherein the one or more UE-chosen IDs includes a plurality of UE-chosen IDs and the method further comprises: generating the report to include an indication of a most recently used UE-chosen IDs of the plurality of UE-chosen IDs.

Example 15 includes a method of operating a base station, the method comprising: receiving, from an access and mobility management function (AMF), a message to authorize a first user equipment (UE) to provide proximity services, the NGAP message to include a relay UE identifier (ID) for the first UE; receiving a measurement report from a second UE, the measurement report to include the relay UE ID: and transmitting configuration information to the first UE to configure the first UE as a relay for the second UE based on the measurement report.

Example 16 includes the method of example 15 or some other example herein, wherein the message is a next-generation application protocol (NGAP) message that comprises a UE context modification request or an initial context setup request.

Example 17 includes a method of operating a function of a core network, the method comprising: assigning a relay user equipment (UE) identifier (ID) to a UE; generating a message to include an identifier (ID) to be used to determine the relay UE ID; and transmitting the message to the UE.

Example 18 includes the method of example 17 or some other example herein, wherein the function is a policy control function (PCF), the message includes a proximity services policy structure, and the ID is the relay UE ID.

Example 19 includes the method of example 17 or some other example herein, wherein the function is an access and mobility management function (AMF) and the ID is an S-temporary mobile subscriber identity (S-TMSI).

Example 20 includes the method of example 19 or some other example herein, further comprising: receiving, from a base station, an inquiry with the relay UE ID; and providing a response to the base station with an indication of the relay UE.

Example 21 includes a method of operating a base station, the method comprising: associating a relay user equipment (UE) identifier (ID) with a UE for provision of relay services; and transmitting an indication of the associating to the UE.

Example 22 includes a method of operating a base station, the method comprising: associating a relay user equipment (UE) identifier (ID) with a UE for provision of relay services; transmitting an indication of the associating to the UE; receiving, from the UE, an ID request: identifying one or more IDs that are not associated with another UE in a cell provided by the base station: and determining the relay UE ID that is to be associated with the UE by selecting an ID from the one or more IDs.

Example 23 includes method of example 22 or some other example herein, further comprising: receiving the ID request in a sidelink UE information message; and transmitting the indication in a radio resource configuration (RRC) message.

Example 24 includes the method of example 21 or some other example herein, wherein the relay UE ID is based on a cell radio network temporary identifier (C-RNTI).

Example 25 includes the method of example 21 or some other example herein, further comprising: disassociating the relay UE ID and the UE based on a determination that the UE is entering an idle mode.

Example 26 includes the method of example 21 or some other example herein, further comprising: receiving, from the UE, an indication that the UE has selected a desired relay UE ID; determining whether the desired relay UE ID is associated with another UE in a cell provided by the base station; and wherein: the relay UE ID is the desired relay UE ID if the desired UE ID is not associated with another UE in the cell; and the relay UE ID is not the desired relay UE ID if the desired UE ID is associated with another UE in the cell.

Example 27 includes the method of example 21 or some other example herein, further comprising: initiating a change of the relay UE ID: or changing the relay UE ID based on a request from the UE.

Example 28 includes a method of example 21 or some other example herein, further comprising: ensuring the relay UE ID is uniquely associated with the UE within a plurality of cells.

Example 29 includes the method of example 21 or some other example herein, further comprising: transmitting the indication to the UE in a radio resource control (RRC) release message; and associating the relay UE ID with an inactive context of the UE.

Example 30 includes a method of example 21 or some other example herein, wherein the relay UE ID is based on an ID of the base station and an ID of the UE.

Example 31 includes a method of example 21 or some other example herein, further comprising: associating the relay UE ID with an inactive-radio network temporary identity (I-RNTI); receiving a measurement report that includes the relay UE ID; and paging the UE with the I-RNTI.

Example 32 includes a method of operating a relay user equipment (UE), the method comprising: receiving an S-temporary mobile subscriber identity (S-TMSI) from an access and mobility management function (AMF); generating a relay UE identifier (ID) based on the S-TMSI and a cell identity: and transmitting a relay discovery announcement with the relay UE ID.

Example 33 includes the method of example 32 or some other example herein, wherein generating the relay UE ID comprises: generating the relay UE ID as a hash value of the S-TMSI and the cell identity.

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 36 may include an apparatus comprising logic, modules, or circuitry to perform one or more elements of a method described in or related to any of examples 1-33, or any other method or process described herein.

Example 37 may include a method, technique, or process as described in or related to any of examples 1-33, or portions or parts thereof.

Example 38 may include an apparatus comprising: one or more processors and one or more computer-readable media comprising instructions that, when executed by the one or more processors, cause the one or more processors to perform the method, techniques, or process as described in or related to any of examples 1-33, or portions thereof.

Example 39 may include a signal as described in or related to any of examples 1-33, or portions or parts thereof.

Example 40 may include a datagram, information element, packet, frame, segment, PDU, or message as described in or related to any of examples 1-33, or portions or parts thereof, or otherwise described in the present disclosure.

Example 41 may include a signal encoded with data as described in or related to any of examples 1-33, or portions or parts thereof, or otherwise described in the present disclosure.

Example 42 may include a signal encoded with a datagram, IE, packet, frame, segment, PDU, or message as described in or related to any of examples 1-33, or portions or parts thereof, or otherwise described in the present disclosure.

Example 43 may include an electromagnetic signal carrying computer-readable instructions, wherein execution of the computer-readable instructions by one or more processors is to cause the one or more processors to perform the method, techniques, or process as described in or related to any of examples 1-33, or portions thereof.

Example 44 may include a computer program comprising instructions, wherein execution of the program by a processing element is to cause the processing element to carry out the method, techniques, or process as described in or related to any of examples 1-33, or portions thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

receive, from a base station, a message with an indication to report user equipment (UE)-chosen identifiers (IDs) used for relay services and a keep interval value, at least one UE-chosen ID is identified as being within a time period based on the keep interval value;

identify the at least one UE-chosen ID used for relay services, the at least one UE-chosen ID being chosen based on upper layer information; and generate a report for transmission to the base station with an indication of the at least one UE-chosen ID.

2. The one or more non-transitory, computer-readable media of claim 1, wherein the instructions, when executed, further cause the processing circuitry to:

determine the keep interval value is provided as zero, is not provided, or is not defined; and identify a most recently used UE-chosen ID as the at least one UE-chosen ID based on said determining.

3. The one or more non-transitory, computer-readable media of claim 1, wherein the at least one UE-chosen ID includes a plurality of UE-chosen IDs and the instructions, when executed, further causes the processing circuitry to:

generate the report to include an indication of a most recently used UE-chosen ID of the plurality of UE-chosen IDs.

4. A method, comprising:

identifying a system information block (SIB) received from a base station, the SIB requesting reporting of an identifier (ID) of a user equipment (UE);

setting the ID based on upper layer information, the ID for inclusion in relay discovery messages; and generating, for transmission, a message that indicates the ID for the UE.

5. The method of claim 4, wherein the ID comprises a source layer 2 (L2) ID.

6. The method of claim 4, wherein the UE acts as a relay UE, and wherein the UE acting as the relay UE comprises the UE acting as a layer 2 (L2) UE-to-network (U2N) relay UE.

7. The method of claim 4, wherein the upper layer information is received via upper layer signaling.

8. The method of claim 7, wherein setting the ID of the UE comprises:

receiving, from a policy control function (PCF), the ID for the UE; and setting the ID of the UE for inclusion in relay discovery messages to the ID for the UE received from the PCF.

9. The method of claim 8, wherein receiving, from the PCF, the ID for the UE comprises receiving proximity service (ProSe) parameters that include the ID for the UE, the ProSe parameters being encoded with a ProSe policy (ProSeP) data structure.

10. The method of claim 7, wherein further comprising receiving, from the upper layer, an upper layer message that indicates the ID for the UE.

11. The method of claim 4, wherein the UE acts as a relay UE by supporting relay services for one or more other UEs.

12. The method of claim 4, wherein the UE is a first UE, wherein the upper layer information is received from the base station based on a measurement report produced by a second UE, and wherein the measurement report is utilized to identify the first UE as a target relay for the second UE.

13. A method, comprising:

generating, for transmission to a user equipment (UE), a system information block (SIB) to elicit an identifier (ID) of the UE used for relay services when the UE is acting as a relay UE; and receiving, from the UE, a message that indicates the ID of the UE, the ID chosen based on upper layer information.

14. The method of claim 13, wherein the ID comprises a source layer 2 (L2) ID.

15. The method of claim 13, wherein the UE is a first UE, and wherein the method further comprises:

receiving, from a second UE, a measurement report; and determining that the first UE is a target relay for the second UE, wherein the transmission is transmitted to the first UE based on the determination that the first UE is the target relay for the second UE.

* * * * *